Aug. 16, 1932.          V. BENDIX          1,872,226
BRAKING SYSTEM
Filed Jan. 30, 1928
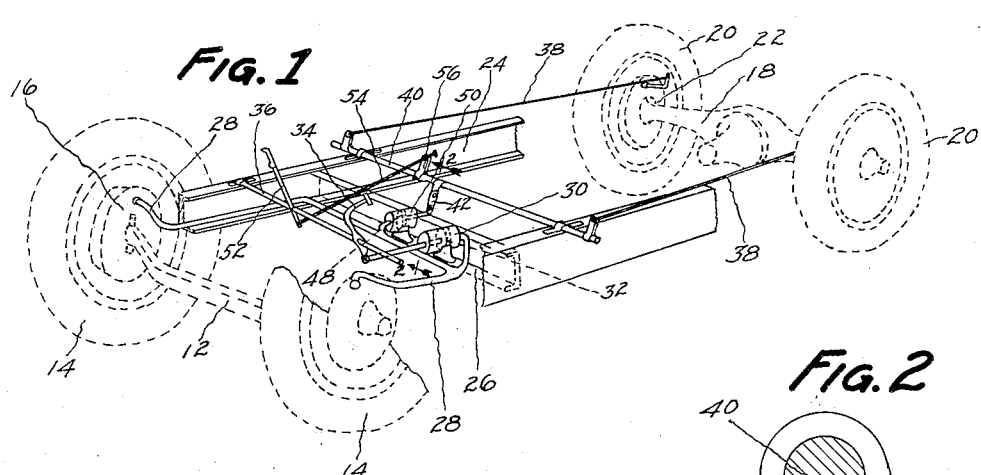
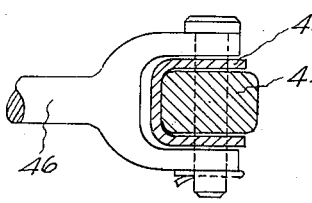
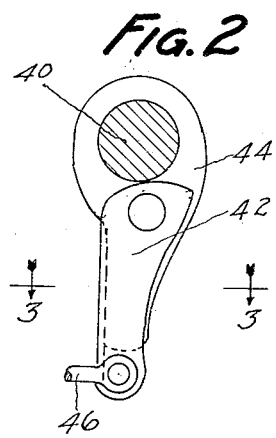
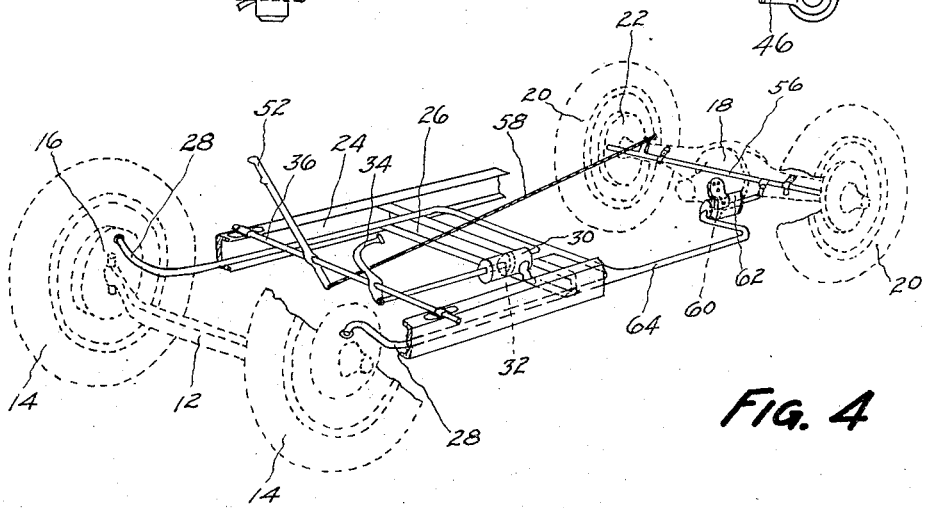
INVENTOR
VINCENT BENDIX
BY
M. W. McConkey
ATTORNEY Patented Aug. 16, 1932

1,872,226

UNITED STATES PATENT OFFICE

VINCENT BENDIX, OF CHICAGO, ILLINOIS, ASSIGNOR TO BENDIX BRAKE COMPANY, OF SOUTH BEND, INDIANA, A CORPORATION OF ILLINOIS

BRAKING SYSTEM

Application filed January 30, 1928. Serial No. 250,397.

This invention relates to braking systems, and is illustrated as embodied in an automobile chassis having a system of four-wheel brakes. An object of the invention is to simplify the engineering of the chassis by using hydraulic operating connections for one set of brakes, for example the front brakes, which hydraulic connections additionally operate the other set of brakes through mechanical connections.

The mechanical connections are illustrated as including a rockshaft supported on the chassis frame or on the rear axle, preferably the former, and which is mechanically connected to the rear brakes.

According to an important feature of the invention, in case of failure of the hydraulic connections the rear brakes can be operated through the above-described mechanical connections, by auxiliary mechanical means such as the usual emergency hand lever. This hand lever is also used in parking. An important feature of the invention is in providing a one-way connection between the mechanical connections and the hydraulic system, so that the latter is not affected by use of the emergency lever in parking, thereby eliminating prolonged use of the hydraulic system under high pressure, which might eventually cause leakage if the hydraulic brakes were used in parking, and also eliminating suction on the hydraulic system due to independent use of the mechanical brakes.

The above and other objects and features of the invention, including various novel combinations of parts and desirable particular constructions, will be apparent from the following description of two illustrative embodiments shown in the accompanying drawing, in which:

Figure 1 is a diagrammatic perspective view of an automobile chassis, showing the above-described braking system with the rockshaft for the rear brakes mounted on the chassis frame;

Figure 2 is a partial section on the line 2—2 of Figure 1, showing the one-way connection between the shaft and the hydraulic system;

Figure 3 is a section through the one-way connection on the line 3—3 of Figure 2; and Figure 4 is a perspective view corresponding to Figure 1, but showing the shaft mounted on the rear axle.

In both embodiments, the automobile or other vehicle has a front axle 12 carried by road wheels 14 having a set of hydraulic brakes 16 of any desired construction, and a rear drive axle 18 supported on road wheels 20 having a set of mechanical brakes 22 of any desired construction. The front and rear axles support, in the usual manner, a chassis frame 24 shown as having a cross member 26.

In both arrangements, also, the hydraulic front set of brakes is operated by conduits or flexible connections 28 from a master cylinder 30. Pressure is provided in the cylinder 30 by any usual type of master piston 32 connected to the usual foot pedal 34. For convenience of illustration, pedal 34 is shown fulcrumed on a support 36 carried by the chassis frame, although ordinarily it would be mounted on the transmission or clutch housing in the usual manner.

The rear brakes 22 are operated by mechanical connections, which in Figure 1 are shown as cables or rods 38 operated by a rockshaft 40 carried by frame 24. Shaft 40 is operated by the hydraulic connections 28 through a one-way operating device, so that emergency operation of the rear brakes, for parking or the like, will not in any way affect the hydraulic system. The particular one-way device shown includes a channel-section lever 42 pivotally embracing an arm 44 fixed on shaft 40, and connected to a rod 46 operated by a piston 48 in an operating cylinder 50 communicating with the hydraulic connections 28. Thus it will be seen that piston 48 operates shaft 40 but shaft 40 does not operate piston 48.

Shaft 40 can also preferably be operated by auxiliary mechanical emergency connections, in case of failure of the hydraulic system or for parking. Said auxiliary connections may comprise an operating element that is preferably connected with the brake operating mechanism by any suitable one-way operating connection. The illustrated auxiliary connections include a hand lever 52 connected by a cable or other tension element 54 to an arm 56 on shaft 40. Since cable 54 is flexible, it does not interfere with the operation of shaft 40 by the hydraulic system.

In the arrangement of Figure 4, the rear brakes 22 are operated by a shaft 56, which corresponds to shaft 40, but which is mounted on the rear axle. Shaft 56 is operated either by a cable or the like 58 from the hand lever 52, or through an operating piston 60 and cylinder 62 connected by a conduit 64 to the above-described hydraulic system. One advantage of this arrangement is that the movements of the rear axle are compensated by the flexibility of conduit 64.

The structure shown in Figure 4, wherein the operating cylinder 60 is mounted on a portion of the vehicle movable relative to the portion on which the master cylinder 30 is mounted, is described and claimed in my co-pending divisional application 605,497 filed April 15, 1932.

While two illustrative embodiments of the invention have been described in detail, it is not my intention to limit its scope to those particular embodiments, or otherwise than by the terms of the appended claim.

I claim:

A vehicle having, in combination, a frame, front wheels having brakes, rear wheels having brakes, foot-operated means for generating hydraulic pressure, hydraulic connections from said means arranged to operate the front brakes, a rockshaft supported by the frame, mechanical operating connections between said rockshaft and rear brakes, a hydraulic operator connected with said means, an arm on said rockshaft, a member pivoted on said arm intermediate the ends of the latter, means pivotally connecting said member and operator, and auxiliary operating means for said rockshaft.

In testimony whereof, I have hereunto signed my name.

VINCENT BENDIX.